United States Patent [19]

Pfister et al.

[11] 3,777,368

[45] Dec. 11, 1973

[54] METHOD OF PRODUCING A COMPOSITE TUBULAR SUPERCONDUCTOR

[75] Inventors: Hans Pfister; Heinrich Diepers, both of Erlangen, Germany

[73] Assignee: Siemens Aktiengesellschaft, Munich, Germany

[22] Filed: Aug. 10, 1972

[21] Appl. No.: 279,388

[30] Foreign Application Priority Data

Aug. 19, 1971 Germany .................. P 21 41 636.4

[52] U.S. Cl.......... 29/599, 174/126 CP, 174/DIG. 6

[51] Int. Cl............................................. H01v 11/00

[58] Field of Search................ 29/599; 174/126 CP, 174/DIG. 6; 335/216

[56] References Cited

UNITED STATES PATENTS

| | | | |
|---|---|---|---|
| 3,507,038 | 4/1970 | Moll et al. | 29/599 |
| 3,548,078 | 12/1970 | Albrecht et al. | 174/DIG. 6 |
| 3,591,705 | 7/1971 | Grigsby et al. | 335/216 X |
| 3,657,466 | 4/1972 | Woolcock et al. | 174/126 CP |
| 3,699,647 | 10/1972 | Bidault et al. | 29/599 |

FOREIGN PATENTS OR APPLICATIONS

| | | | |
|---|---|---|---|
| 1,952,148 | 8/1970 | Germany | 29/599 |

*Primary Examiner*—Charles W. Lanham
*Assistant Examiner*—D. C. Reiley, III
*Attorney*—Hugh A. Chapin

[57] ABSTRACT

A method of producing tubular conductors includes bending a conductor band to abut the longitudinal edges thereof to form a tube. The conductor band includes a layer of niobium adjacent a layer of an electrically normal conducting metal and ribbon-like niobium chords that define the respective longitudinal edges of the band. After the tube is formed, the niobium chords are joined to each other. The method is especially suited for producing tubular conductors for superconducting cables and the like such as superconducting alternating-current cables.

18 Claims, 8 Drawing Figures

METHOD OF PRODUCING A COMPOSITE TUBULAR SUPERCONDUCTOR

BACKGROUND OF THE INVENTION

The invention relates to a method of manufacturing tubular conductors having a niobium layer and a layer of electrically normal-conducting metal. The tubular conductors produced according to the invention are especially adaptable for superconducting cables and the like.

Superconducting cables are suited for transmitting energy by superconductors. In class II superconductors which can, for example, consist of $Nb_3Sn$, NbZr, NbTi, the current flow takes place over the entire cross-section of the conductor. These conductors are usable up to very high magnetic field strengths without losing their property of superconductivity and are therefore particularly well suited for superconducting direct-current cables. On the other hand, for superconducting alternating-current or three-phase cables, only class I superconductors can be considered. For such superconductors, lead is well suited because of its relatively high critical magnetic field strength $H_c$.

Class II superconductors with a high lower critical magnetic field $H_{cl}$ can be used in fields below $H_{cl}$, because in this situation the conductors are operated in the Meissner state, and appreciable alternating-current losses of the superconductors are thereby avoided. Niobium has the highest known value of $H_{cl}$ and is therefore particularly well suited for superconducting alternating-current transmissions. The lower critical field $H_{cl}$ as well as the alternating-current losses still occurring below this value in niobium depend on various material properties. It has been found that the lower critical field $H_{cl}$ is substantially reduced by impurities and by cold working the niobium, whereas the alternating-current losses increase substantially particularly with surface roughness. The alternating-current flows only at the surface in a very thin layer.

From the journal NATURWISSENSCHAFTEN, number 57, pages 414 to 422 (1970), it is known to use as superconductors for three-phase cables, a combination of niobium with good conducting metal normal conductors such as copper and aluminum. The normal conductor of high electric conductivity can take over the excess current in case of disturbances and it has, moreover, a stabilizing effect in the case of local temperature rises of the superconductor. For this reason tubular superconductors of the highly conducting metal are used on which a superconducting niobium layer is applied on the outside or the inside. It is important that this layer have the best possible thermal and electric contact with the metal tube.

The superconduction current below the critical field strength $H_{cl}$ is a surface current with a depth of penetration of only about 1/10 $\mu$m. and a very thin layer of niobium of the order of 1 $\mu$m is therefore sufficient. It is not practical to select the thickness of the copper tube much larger than 1 mm, because of the skin effect copper layers in excess of this thickness do not contribute appreciably to the conduction of current in the event of an overload. The diameter of the copper tube is predetermined by the requirement that the magnetic field which the transported current generates at the point of the niobium layer must be smaller than the lower critical field strength $H_{cl}$.

According to Mellors and Senderoff in the Journal of the Electrochemical Society, number 112 (1965), page 266, very pure and highly adhesive niobium layers can be deposited on a suitable substrate, for example, copper, by means of fusion electrolysis in a melt of niobium alkali fluorides at temperatures of about 800° C, and according to measurements by Beall and Mayerhoff described in the Journal of Applied Physics, number 40 (1969) page 2051, these layers exhibit low alternating-current losses. However, the coating of substantial length of copper tubes with niobium according to this method presents various difficulties because these tubes must be admitted to and removed from the fluoride melt, which is at least 740° C, through vacuum locks.

SUMMARY OF THE INVENTION

It is an object of the invention to provide a method of producing tubular conductors for superconducting cables and the like which substantially obviates the foregoing disadvantages. It is another object of the invention to simplify the production of such tubular conductors.

The invention is based on the realization that the production of the tubular conductor can be considerably simplified if first a band of the composite material is produced, then bent to form a tubular member and subsequently welded at the seam. However with the method as such, the very different melting points of niobium and the normal conducting material, particularly copper, create new difficulties. When welding the bimetal, the danger exists that the copper can diffuse too much and too deep into the niobium welding seam and contaminate the latter. Moreover, tight welding of copper is successful only with very pure material. If the bimetallic strip is bent to form a tube with the niobium layer on the inside, the low-melting copper faces the electron-beam and it is not possible to weld the niobium. The melting point of niobium is 2487° C whereas copper melts already at 1084° C. The vapor pressure of liquid copper above 2000° C is already so high that during the welding process the liquid niobium would be displaced by the copper with an explosive effect and would practically be shot away.

It is therefore still another object of the invention to provide a method of producing tubular conductors for superconducting cables which also avoids the above-mentioned difficulties.

According to a feature of the invention, a band is provided which includes a layer of niobium adjacent a layer of electrically normal conducting metal. The band includes niobium chords at its edges. This band is bent to form a tube in such a manner that the niobium chords disposed at the two edges of the band butt against each other. Then the niobium chords are joined together. The two chords are preferably joined by means of electron-beam welding. In this method, only two mutually adjacent surfaces of the same material need to be welded together for making the tube seam and this can be done without great difficulty.

According to another feature of the invention, the conductor band is produced by electron-beam welding ribbon-like niobium chords to the respective longitudinal edges of a niobium foil strip so as to form a niobium band having a U-shaped cross-section. Then the step of at least partially filling the space bounded by the inside surface of the U-shaped niobium band with an electrically normal conducting metal is performed followed by the step of applying heat to the normal conducting metal and the U-shaped niobium band to join the normal conducting metal to the foil and the chords.

Copper is preferably used as the normal conducting metal of the conductor band. The copper is preferably configured in the form of a strip and has dimensions such that it fills, at least approximately, the space enclosed by the niobium foil and the two niobium chords. The heat treatment of this composite band is then chosen so that a diffusion bond between the niobium and the copper is achieved. To this end, the composite band is advantageously directed through a hot zone, the temperature and the travel velocity of the composite band being matched with respect to each other so that the contact surfaces between the copper and the niobium are joined together.

Thus, the conductor band can be produced by laying a copper strip into the space bounded by the inside surface of the U-shaped niobium band, the copper strip thereby having respective contacting surfaces contacting the niobium foil and niobium chords. This is followed by the step of passing the composite band consisting of the copper strip and U-shaped niobium band through a heated zone where the heat is sufficient to cause the copper strip to become joined with the niobium foil and niobium chords at least at these contacting surfaces.

The strip can be heated inductively, for example, by an induction coil, or also by radiation, by leading the strip through a resistance tube furnace. Particularly well suited for heating up the contact surfaces is an electron-beam which can be directed onto the niobium side as well as onto the copper side of the composite band. The electron beam can be deflected as a spot across the width of the band or it can be linearly directed transversely to the width of the composite band.

It is furthermore possible to first provide the two edges of the metal strip with niobium chords by diffusion, the metal strip being preferably copper. The lateral edges of the copper strip are joined with the adjacent surfaces of the niobium chords by melting the copper in the vicinity of the adjoining niobium surface, for example, by an electron beam directed onto the copper near the edge. The niobium layer can be applied to the strip fabricated in this manner by fusion electrolysis.

The two edges of a niobium foil can also be welded to respective niobium chords and a diffusion bond can be established subsequently between the niobium foil and the copper strip. It may be advisable in some cases to make the diffusion bond between the niobium layer and the copper layer only after both have been bent to form a tube and the niobium chords have been welded together.

Although the invention is illustrated and described herein as a method of producing a tubular conductor for superconducting cables and the like, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIG. 2 illustrates the niobium chords and foil being passed through an electron-beam welding facility for joining the chords to the foil. FIG. 1 is a sectional view of the chords and foil taken along line I—I of FIG. 2.

FIG. 4 shows the niobium section and normal conducting metal being passed through a heat treatment facility. FIG. 3 is a sectional view of the U-shaped niobium section filled with the normal conducting metal taken along the line III—III in FIG. 4.

FIG. 6 illustrates the chords and copper strip being passed through a heat treatment facility. FIG. 5 is a sectional view of the copper strip and niobium chords taken along the line V—V of FIG. 6 and showing the margin regions of the strip which are melted during heat treatment for joining the chords.

DESCRIPTION OF THE PREFERRED EMBODIMENTS

Figure 1:
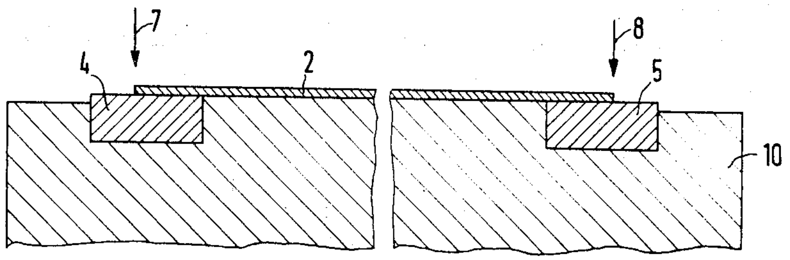
FIGS. 1 and 2 illustrate the step of attaching the niobium foil to ribbon-like niobium chords.

Referring to FIG. 1, the two lateral edges of a very thin, strip-like foil 2 are placed with its two edges on a ribbon-shaped conductor. The ribbon-shaped conductor is in the form of two ribbon-like chords 4 and 5 that respectively receive the edges of foil 2. The chords 4 and 5 are made of niobium. A thickness of the niobium foil 2 of less than 1 $\mu$ is sufficient as the superconducting surface layer. The thickness of the foil can therefore be about 0.1 $\mu$, but should preferably be at least 5 $\mu$, because very thin foils are difficult to produce and are also difficult to process. The thickness of the foil can therefore be selected preferably at about 20 $\mu$ and even up to 50 $\mu$. However, it should not be much more than 100 $\mu$ because a foil thickness in excess of this has essentially no useful effect. The niobium foil 2 is preferably welded to the chords 4 and 5 by means of an electron beam which is directed approximately toward the edge of the strip as indicated in FIG. 1 by the arrows 7 and 8 respectively. It is advantageous to place the chords 4 and 5 and the foil 2 on an appropriately profiled support which can serve at the same time as a transport means.

Figure 2:
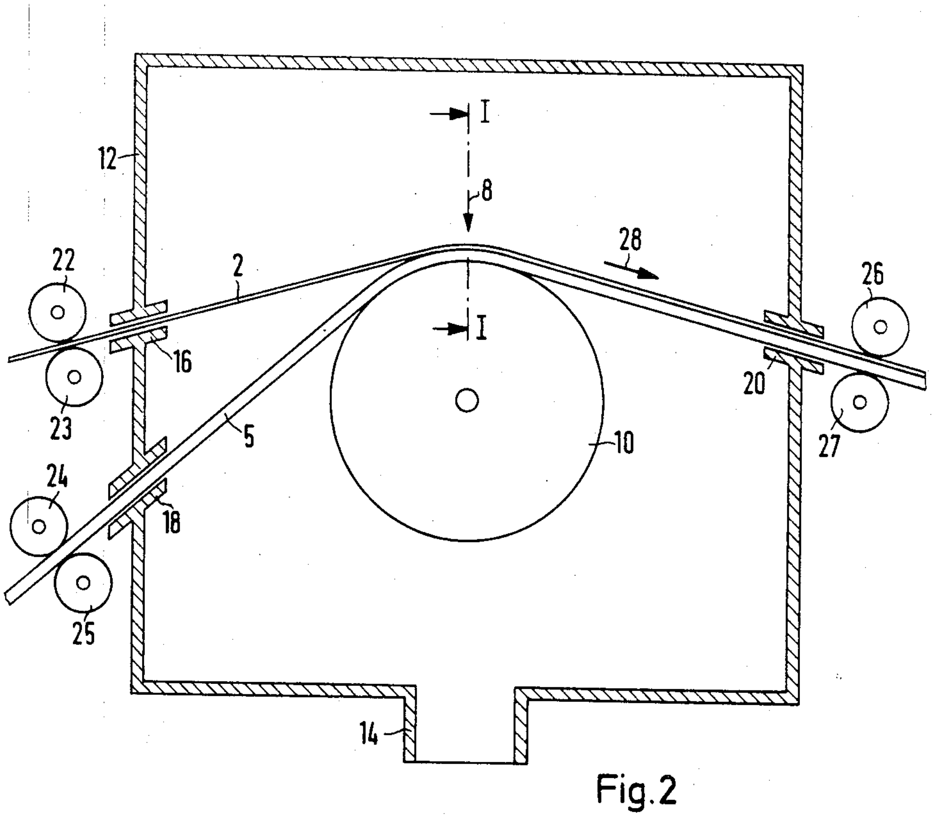

In FIG. 2, the support 10 for the foil 2 and the ribbons 4 and 5 is in the form of a drum and serves as the transport mechanism of an electron-beam welding machine having a housing 12. The housing 12 of the electron-beam welding machine is equipped with a connection stub 14 for a vacuum pump as well as with vacuum-tight feedthroughs 16, 18 and 20 for the foil strip 2 and chord strip 5 to be treated as well as for the chord strip 4 which is not visible in the view of FIG. 2. For each strip there is provided outside the housing 12 a transport and feed device which may include rollers in a manner known per se and which are designated with reference numerals 22 to 27. The beam generator for the electron beam 8 is not shown in FIG. 2 and can be constructed in a manner known per se. The beam generator may, for example, deliver an electron flow of about 2.3 mA at a voltage of 200 kV. By means of a corresponding speed of rotation of the transport mechanism represented by 10, a travel velocity of the strips 2, 4 and 5 of about 8.4 mm/sec relative to the electron beams 8, 7 is chosen, the beam 7 not being visible in the view of FIG. 2. The niobium band is moved at this speed as indicated by the arrow 28. The welding process can advantageously be carried out in a vacuum of about $10^{-4}$ Torr.

Figure 3:
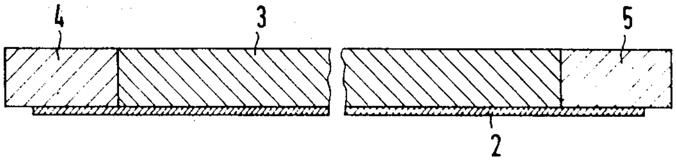
FIGS. 3 and 4 illustrate the steps of filling the free space of a U-shaped niobium section with normal conducting metal and joining the section to the normal conducting metal.
Figure 4:
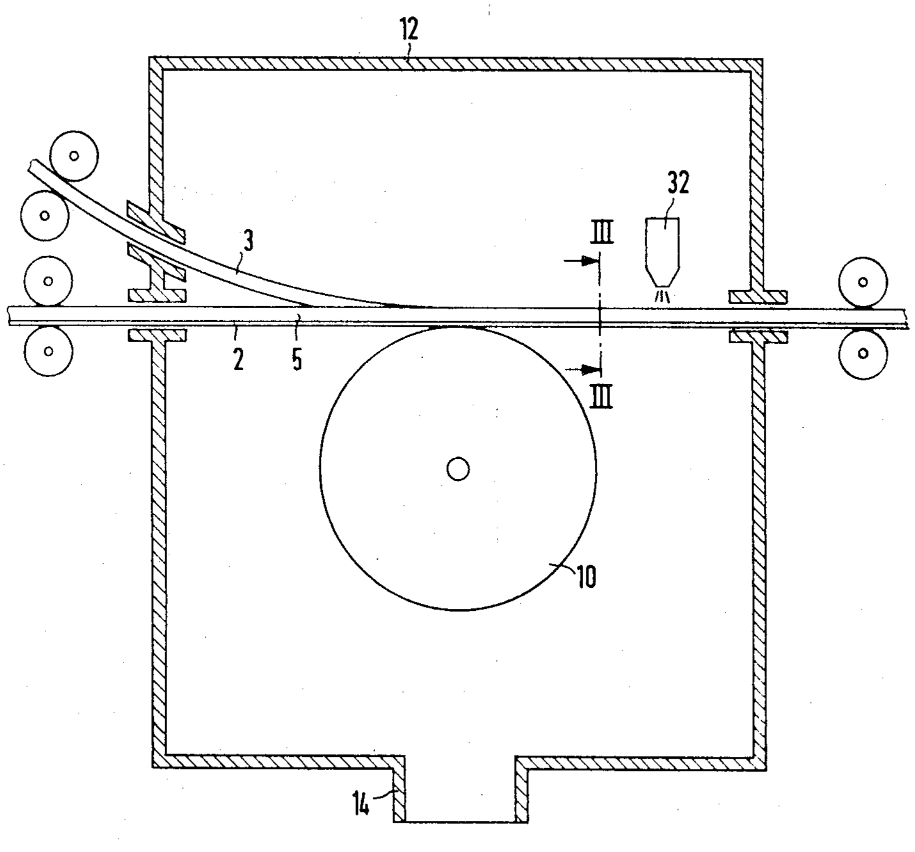

Into the U-shaped section defined by the chords 4, 5 and the foil 2 produced as described above, there is placed, according to FIG. 3, a strip 3 of normal-conducting material which can preferably be copper. However, other materials aside from copper are suitable for producing the composite band. Typical of such materials are aluminum or nickel as well as their alloys. The U-shaped niobium section and the inserted copper strip 3 are subjected to a heat treatment in such a manner that a diffusion bond is formed between the mutually adjacent surfaces of the niobium and the copper.

To form this bond, the U-section consisting of the niobium chords 4 and 5 as well as the copper strip 3 are directed through the evacuated housing 12 of the welding facility by means of the transport mechanism 10. In housing 12 there is arranged a specially constructed electron-beam device 32 in the form of an electron gun which generates a linearly shaped electron beam that extends transversely across the width of the transported band, the band being a composite band of chords 4 and 5, the foil 2 and the copper strip 3. The beam intensity of the electron gun 32 and the transport velocity of the transport mechanism 10 are matched in such a manner that the copper is melted in a small area across the width of the niobium strip foil thereby forming a diffusion bond between the copper strip 3 and the niobium foil 2 as well as between the strip 3 and the adjacent chords 4 and 5.

The thickness of the niobium chords 4 and 5 can preferably be selected to be approximately equal to the thickness of the copper strip and therefore be about equal to the thickness of the tubular conductor cross-section to be produced. The thickness of the copper strip may preferably be at least 1 mm because the depth of penetration of the current into the copper is generally not more than about a millimeter if the superconductor manufactured according to the invention is used for a single-phase or three-phase cable at a frequency of 50 or 60 Hz. However, this does not preclude using the method for the manufacture of tubular conductors having a conductor cross-section which in some cases can be up to 10 mm and more.

Figure 5:
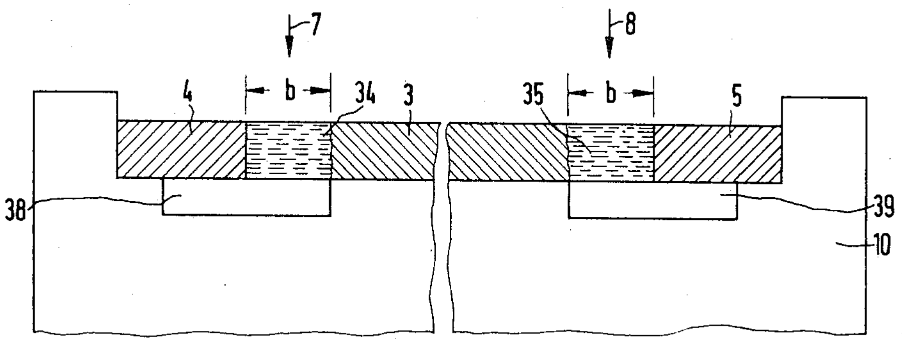
FIGS. 5 and 6 illustrate diffusion joining respective niobium chords to the respective longitudinal edges of a copper strip.

According to FIG. 5, the copper strip 3 can be first provided at its two edges with niobium chords 4 and 5, respectively. For this purpose, the electron beams 7 and 8 are directed onto the surface of the copper strip 3 in the vicinity of the respective edges of the strip and the copper strip is thereby melted at the edge over a width b of up to about 2 mm, if the copper strip 3 is about 1 mm thick. Underneath the melt portions 34 and 35, the profile of the transport drum 10 can advantageously be provided with respective recesses 38 and 39. These recesses 38 and 39 reduce the heat transfer from the contact point to the transport drum 10. Additionally, the drum can be, for example, cooled with water. The copper melt portions 34 and 35 produced at the respective edges is held in place by its own surface tension.

In this embodiment, the niobium chords 4 and 5 can have a width of 3 mm each. The strips are joined to the edges of a copper strip 3 which can be 120 mm wide. This configuration of the copper strip with the niobium chords welded on is based on the recognition of the fact that for joining the copper edge to the niobium chord, it is only necessary to heat the materials to at least the melting point of the copper. It is therefore also possible to direct the electron beams 7 and 8 toward the respective niobium chord and to heat the latter so that the copper edge adjacent the niobium chord is heated at least to the melting point of the copper through heat conduction from the niobium chord to the copper. The heat is transferred from the niobium to the adjoining copper and the copper melts in the adjoining edge zone.

Figure 6:
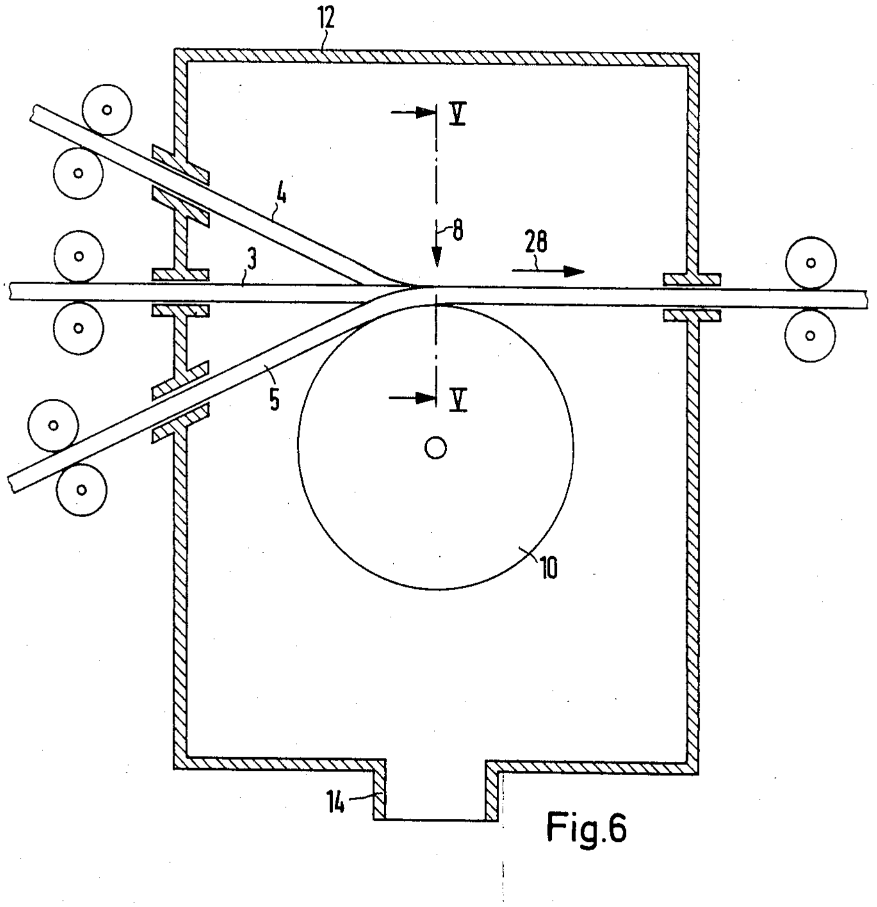

The two niobium chords 4, 5 and copper strip 3 are directed through the evacuated treatment zone of the housing 12 of the electron-beam welding machine according to FIG. 6 and are moved by means of a transport arrangement 10 through the treatment space as indicated by the arrow 28.

A strip 3 with the dimensions given in FIG. 5 can be joined to the chords 4 and 5 in the machine according to FIG. 6, for example, with a voltage of 110 kV and respective electron currents of about 6 mA in a vacuum of about $10^{-4}$ Torr. The relative speed between the composite strip and the electron beam may advantageously be selected at about 1.4 mm/sec.

Figure 7:
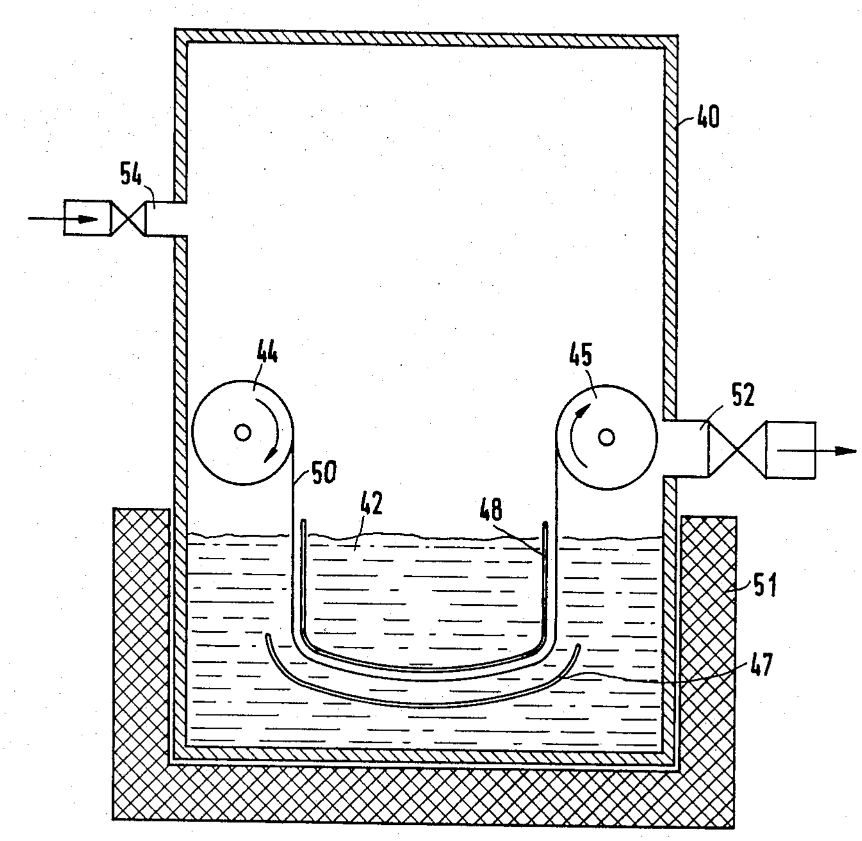
FIG. 7 illustrates applying a niobium layer by fusion electrolysis to one side of the composite strip produced according to the steps illustrated in FIGS. 5 and 6.

The composite strip fabricated in this manner and including a copper strip provided with niobium chords is then further provided with a niobium coating on at least one flat side. For this purpose, a fusion electrolysis facility as shown in FIG. 7 may be used. The facility can include a vacuum-tight housing 40, an electrolyte 42, a transport device depicted by rollers 44 and 45 as well as an anode 47 and a wiper 48. The lower part of the housing 40 contains the electrolyte 42 and is enclosed by an oven 51. There is furthermore provided a connection 52 for a vacuum pump as well as a connection 54 for supplying protective gas.

The strip 50 is to be coated in continuous operation and has, for example, a thickness of 1 mm and is provided with niobium chords according to FIG. 5. The strip 50 unwinds from a reel (not shown) within the housing 40 and is directed via the transport roller 44 through the melt 42 for coating with niobium and is subsequently rewound via the second transport roller 45 onto a second reel (not shown). The second reel can also be arranged within the coating facility 40. The wiper 48 serves for wiping off the electrolyte. The strip 50 is advantageously coated only on one of its flat sides. The equipment, however, can also be arranged so that the strip can be coated with niobium on both sides.

The electrolyte 42 may preferably consist of an alkali niobium fluoride. With a current density of, for example, about 40 mA/cm² between the anode 47 and the strip 50 serving as the cathode, a layer thickness of the niobium coating of about 0.6 μ per minute is obtained at a temperature of the liquid electrolyte of, for example, 740° C. With an appropriate velocity of the strip, a layer of 30 μ can, for example, also be produced.

Figure 8:
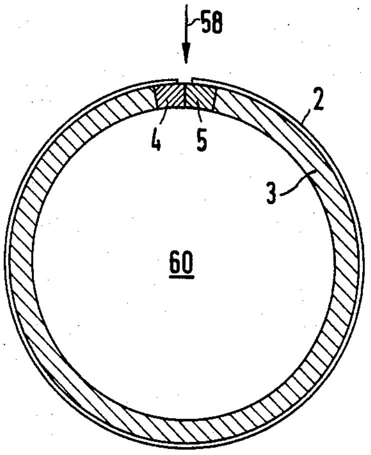
FIG. 8 is a sectional view of a tubular conductor produced according to the method of the invention.

The strip produced by the method according to the invention as exemplified in the illustrated embodiments and made of the normal-conducting material provided with a niobium layer 2 and joined to the chords 4 and 5 can subsequently be curved and configured as shown in FIG. 8 to form a tubular conductor 60. Thereafter, the mutually adjacent outer edges of the chords 4 and 5 are joined together, for example, by welding in an atmosphere of protective gas. Preferably, the outer edges are joined by welding with an electron beam 58. In the finished conductor 60, the niobium layer 2 can also be disposed on the inside of the carrier 3.

With a voltage of 110 kV and an electron current 58 of about 4 mA, for example, welding can be performed at a relative velocity between the electron beam 58 and the conductor 60 of about 1.3 mm/sec. In general, it is advisable to move the strip during the heat treatment. However, the method according to the invention can be performed in the same manner if the strip is stationary and the heat source such as an electron beam or more specifically, the radiation source, is moved.

What is claimed is:

1. Method of producing tubular conductors for superconducting cables and the like comprising bending a conductor band to abut the longitudinal edges thereof to form a tube, the conductor band including a layer of niobium adjacent a layer of an electrically normal conducting metal, and respective ribbon-like niobium chords defining the longitudinal edges of the band; and metallurgically bonding the niobium chords to each other.

2. The method of claim 1 wherein the niobium chords are bonded to each other by electron-beam welding.

3. The method of claim 1 comprising the steps of producing the conducting band by electron-beam welding ribbon-like niobium chords to the respective longitudinal edges of a niobium foil strip so as to form a niobium band having a U-shaped cross section, at least partially filling the space bounded by the inside surface of the U-shaped niobium band with an electrically normal conducting metal, and then applying heat to the normal conducting metal and the U-shaped niobium band to metallurgically bond the normal conducting metal to the foil and the chords.

4. The method of claim 3 wherein the electrically normal conducting metal is copper.

5. The method of claim 4 comprising laying a copper strip into the space bounded by the inside surface of the U-shaped niobium band, the copper strip thereby having respective contacting surfaces contacting the niobium foil and niobium chords, and passing the composite band consisting of the copper strip and U-shaped niobium band through a heated zone where the heat is sufficient to cause the copper strip to become metallurgically bonded to the niobium foil and niobium chords at least at said contacting surfaces.

6. The method of claim 5 wherein the heat in the heated zone is generated by induction.

7. The method of claim 5 wherein the heat in the heated zone is generated by radiation.

8. The method of claim 5 wherein the heat in the heated zone is generated by an electron beam.

9. The method of claim 8 comprising directing the electron beam onto the niobium side of the composite band.

10. The method of claim 8 comprising directing the electron beam onto the copper side of the composite band.

11. The method of claim 8 comprising deflecting the electron beam as a spot across the width of the composite band.

12. The method of claim 8 comprising linearly directing the electron beam transversely to the width of the composite band.

13. The method of claim 1 wherein the normal conducting layer is a copper strip, the method comprising the steps of producing the conductor band by first diffusion bonding ribbon-like niobium chords to the side edges of the copper strip respectively to form respective diffusion bonds, and applying a niobium layer to at least one side of the band consisting of the niobium chords and copper strip to form a composite band.

14. The method of claim 13 wherein the diffusion bonds between the niobium chords and the copper strips are formed by heating respective edge zones of the copper strips adjoining the chords with an electron beam above the melting point of the copper.

15. The method of claim 13 comprising the step of applying the niobium layer by fusion electrolytically depositing the niobium onto the band consisting of the niobium chords and copper strip.

16. Method of claim 13 wherein the niobium layer is a niobium foil, the method comprising welding the niobium foil onto the niobium chords, and applying heat to diffusion bond the niobium foil to the copper strip.

17. The method of claim 16, wherein after welding the niobium foil onto the niobium chords, the method comprises bending the composite band to abut the chords to form a member of tubular cross-section, welding the abutting chords to each other, and then diffusion bonding the niobium foil to the copper strip.

18. The method of claim 16 wherein after welding the niobium foil onto the niobium chords, the method comprises bending the composite band to abut the chords to form a member of tubular cross-section, diffusion bonding the niobium foil to the copper strip, and then welding the abutting surfaces of the chords to each other.

* * * * *